(12) United States Patent
Sayers

(10) Patent No.: US 7,716,871 B1
(45) Date of Patent: May 18, 2010

(54) FISHING LURE

(76) Inventor: Joe Sayers, 277 Broadway Blvd., Battle Creek, MI (US) 49017

( * ) Notice: Subject to any disclaimer, the term of this patent is extended or adjusted under 35 U.S.C. 154(b) by 0 days.

(21) Appl. No.: 11/891,119

(22) Filed: Aug. 9, 2007

(51) Int. Cl.
*A01K 85/16* (2006.01)
(52) U.S. Cl. ............ 43/42.48; 43/42.45; 43/42.39
(58) Field of Classification Search ........... 43/42.48, 43/42.45, 42.39
See application file for complete search history.

(56) References Cited

U.S. PATENT DOCUMENTS

| | | | | |
|---|---|---|---|---|
| D47,706 S | * | 8/1915 | Yakeley | 43/42.48 |
| 1,239,956 A | * | 9/1917 | Phinney | 43/42.48 |
| 1,268,635 A | * | 6/1918 | Shuff | 43/42.48 |
| D53,610 S | * | 7/1919 | Reynolds | 43/42.48 |
| D54,071 S | * | 11/1919 | Dills | 43/42.48 |
| 1,338,953 A | * | 5/1920 | Odell | 43/42.48 |
| 1,418,326 A | * | 6/1922 | Pflueger et al. | 43/42.48 |
| 1,483,842 A | * | 2/1924 | Carter | 43/42.48 |
| 1,486,028 A | * | 3/1924 | Meighen | 43/42.45 |
| 1,489,207 A | * | 4/1924 | Hall | 43/42.48 |
| 1,520,636 A | * | 12/1924 | Feiker | 43/42.48 |
| 1,545,683 A | * | 7/1925 | Nowak | 43/42.48 |
| 1,600,652 A | * | 9/1926 | Steenstrup | 43/42.48 |
| 1,606,176 A | * | 11/1926 | Paulson | 43/42.48 |
| 1,692,935 A | * | 11/1928 | Heddon | 43/42.48 |
| 1,786,568 A | * | 12/1930 | Kutz | 43/42.48 |
| 1,801,951 A | * | 4/1931 | Buchanan | 43/42.48 |
| 1,828,574 A | * | 10/1931 | Neukam | 43/42.48 |
| 1,854,696 A | * | 4/1932 | Herington | 43/42.48 |
| 1,865,360 A | * | 6/1932 | Eger | 43/42.48 |
| 1,878,015 A | * | 9/1932 | Steffensen | 43/42.45 |
| 1,929,150 A | * | 10/1933 | Peckinpaugh | 43/42.48 |

(Continued)

FOREIGN PATENT DOCUMENTS

JP 2008067639 A * 3/2008

(Continued)

*Primary Examiner*—Darren W Ark
(74) *Attorney, Agent, or Firm*—Young Basile Hanlon & MacFarlane, P.C.

(57) ABSTRACT

A fishing lure for spraying water droplets fore and aft of the fishing lure. The fishing lure has a monolithic fishing lure body extending along an axis from a head end to a tail end of the fishing lure body. A first substantially planar surface is formed at the head end of the fishing lure body such that the first substantially planar surface forms a first angle with respect to the axis. A second substantially planar surface is formed at the head end of the fishing lure body such that the second substantially planar surface forms a second angle with respect to the axis. A third angle is formed with respect to the first and second substantially planar surfaces such that the third angle is the sum of the first angle and the second angle. A crotch is defined by the intersection of the first substantially planar surface and the second substantially planar surface. The crotch extends through and substantially transverse to the axis, wherein the crotch and the axis cooperate to define a plane that defines the fishing lure body into an upper portion and a lower portion adjacent to the first substantially planar surface and the second substantially planar surface, respectively. A hook tie eyelet for pivotally attaching a fishing hook thereto is connected to a central portion of the lower portion of the fishing lure body, and a line tie eyelet is connected to the head end of the fishing lure body.

17 Claims, 3 Drawing Sheets

U.S. PATENT DOCUMENTS

| | | | | |
|---|---|---|---|---|
| 1,951,626 A * | 3/1934 | Pashley | | 43/42.48 |
| D93,369 S * | 9/1934 | Wooster | | 43/42.48 |
| D93,370 S * | 9/1934 | Wooster | | 43/42.48 |
| 2,069,972 A * | 2/1937 | Schroeder | | 43/42.48 |
| 2,100,289 A * | 11/1937 | Khoenle | | 43/42.48 |
| 2,102,492 A * | 12/1937 | Stolley | | 43/42.48 |
| 2,181,254 A * | 11/1939 | Wilson | | 43/42.48 |
| 2,183,059 A * | 12/1939 | Bacon | | 43/42.48 |
| D121,928 S * | 8/1940 | Nelson | | D22/133 |
| 2,215,772 A * | 9/1940 | Vecchia | | 43/42.48 |
| 2,225,676 A * | 12/1940 | White | | 43/42.48 |
| 2,236,353 A * | 3/1941 | Minser | | 43/42.48 |
| 2,290,702 A * | 7/1942 | Nelson | | 43/42.48 |
| 2,315,247 A * | 3/1943 | Davenport | | 43/42.48 |
| D147,102 S * | 7/1947 | Adams et al. | | 43/42.48 |
| 2,424,096 A * | 7/1947 | Janchan | | 43/42.48 |
| D151,276 S * | 10/1948 | Lamb | | 43/42.48 |
| D152,176 S * | 12/1948 | Sisco | | D22/133 |
| 2,459,288 A * | 1/1949 | Robbins et al. | | 43/42.48 |
| 2,461,755 A * | 2/1949 | Miller | | 43/42.48 |
| 2,476,006 A * | 7/1949 | Townsend | | 43/42.48 |
| D158,349 S * | 4/1950 | Wiinikka | | 43/42.45 |
| 2,516,468 A * | 7/1950 | Klein | | 43/42.48 |
| 2,518,487 A * | 8/1950 | Metz | | 43/42.48 |
| 2,524,370 A * | 10/1950 | White | | 43/42.48 |
| 2,542,776 A * | 2/1951 | Key | | 43/42.48 |
| 2,547,103 A * | 4/1951 | White | | 43/42.48 |
| 2,559,169 A * | 7/1951 | Pemberton | | 43/42.48 |
| 2,561,040 A * | 7/1951 | Arbogast | | 43/42.48 |
| 2,603,903 A * | 7/1952 | Brown | | 43/42.48 |
| 2,611,209 A * | 9/1952 | Pond | | 43/42.48 |
| 2,641,862 A * | 6/1953 | Poe | | 43/42.48 |
| 2,663,965 A * | 12/1953 | Rosen | | 43/42.39 |
| 2,686,381 A * | 8/1954 | Peterson | | 43/42.39 |
| 2,715,791 A * | 8/1955 | Kautzky | | 43/42.48 |
| 2,736,124 A * | 2/1956 | Wittmann, Jr. | | 43/42.39 |
| D177,176 S * | 3/1956 | Hege | | 43/42.45 |
| 2,745,206 A * | 5/1956 | Gaw | | 43/42.48 |
| 2,751,704 A * | 6/1956 | Gusdanovic | | 43/42.48 |
| 2,756,534 A * | 7/1956 | Cash | | 43/42.48 |
| 2,756,535 A * | 7/1956 | Dean | | 43/42.48 |
| 2,766,544 A * | 10/1956 | Silverthorne | | 43/42.48 |
| 2,766,545 A * | 10/1956 | Wimer | | 43/42.48 |
| 2,775,841 A * | 1/1957 | Baker | | 43/42.48 |
| 2,817,181 A * | 12/1957 | Bartlett | | 43/42.45 |
| 2,829,462 A * | 4/1958 | Stokes | | 43/42.48 |
| 2,861,380 A * | 11/1958 | Peterson | | 43/42.48 |
| 2,878,611 A * | 3/1959 | Netherton et al. | | 43/42.39 |
| 2,878,612 A * | 3/1959 | Netherton et al. | | 43/42.39 |
| 2,932,113 A * | 4/1960 | Gawehn | | 43/42.39 |
| 2,933,846 A * | 4/1960 | Garner | | 43/42.48 |
| D188,602 S * | 8/1960 | Mecate | | 43/42.48 |
| 2,963,812 A * | 12/1960 | Kellogg | | 43/42.39 |
| 3,059,372 A * | 10/1962 | Hagel | | 43/42.45 |
| 3,125,822 A * | 3/1964 | Burback | | 43/42.48 |
| 3,175,325 A * | 3/1965 | Tiikkainen | | 43/42.39 |
| 3,205,609 A * | 9/1965 | Knapton | | 43/42.39 |
| 3,303,597 A * | 2/1967 | Leach | | 43/42.39 |
| D211,787 S * | 7/1968 | Campbell | | 43/42.45 |
| 3,702,035 A * | 11/1972 | Pope | | 43/42.48 |
| 3,982,349 A * | 9/1976 | Hills | | 43/42.48 |
| 4,006,552 A * | 2/1977 | Cunningham | | 43/42.48 |
| 4,266,360 A * | 5/1981 | Smith | | 43/42.48 |
| 4,305,220 A * | 12/1981 | Couillard | | 43/42.48 |
| 4,435,914 A * | 3/1984 | Norman | | 43/42.12 |
| 4,671,006 A * | 6/1987 | Schuyler, Jr. | | 43/42.48 |
| 4,674,224 A * | 6/1987 | Williams | | 43/42.48 |
| D311,433 S * | 10/1990 | Pottger et al. | | D22/126 |
| 5,369,906 A * | 12/1994 | Anterni | | 43/42.48 |
| 5,477,634 A * | 12/1995 | Welcome | | 43/42.48 |
| 5,522,170 A * | 6/1996 | Cole | | 43/42.15 |
| 5,598,659 A * | 2/1997 | Vanorden | | 43/42.45 |
| 6,035,574 A * | 3/2000 | Ware | | 43/42.39 |
| 6,484,434 B1 * | 11/2002 | Elges | | 43/42.39 |
| D495,397 S * | 8/2004 | Pearce | | D22/133 |
| 7,000,346 B1 * | 2/2006 | Jussaume | | 43/42.48 |
| 7,337,579 B2 * | 3/2008 | Thomas | | 43/42.48 |
| 2001/0049900 A1 * | 12/2001 | Peck | | 43/42.39 |
| 2004/0107628 A1 * | 6/2004 | Mueller | | 43/42.39 |

FOREIGN PATENT DOCUMENTS

WO     WO 9207462 A1 * 5/1992

* cited by examiner

FISHING LURE

FIELD OF THE INVENTION

The present invention relates to the field of fishing lures, and more particularly, the present invention relates to a surface fishing lure, wherein the fishing lure is configured to spray water droplets fore and aft of the fishing lure.

BACKGROUND OF THE INVENTION

Sport and recreational fishing are both immensely popular. Among sport and recreational fishing, line fishing using a rod and reel is the most popular. Typically, an artificial fishing lure or hook with live bait is connected to the fishing line to attract a fish and to bait it into biting the fishing lure or hook. Of course, due to the numerous species of fish and the varied aquatic habitats in which they are found, a wide variety of fishing lure designs have been developed. Such fishing lure designs often correspond to one or more techniques known to be effective in catching a particular type of fish in a particular aquatic habitat.

One particular class of fishing lures, known as surface lures, is effective in catching fish that typically prey on animals, fish, or insects that are found near or on the surface of the water. In order to attract such fish, surface lures are typically designed to generate turbulence or prey-like motion. However, when fishing for some fish, such as bass, it is important to generate as much motion or turbulence as possible without moving the fishing lure a great distance in order to make the fishing lure an easy target for the fish. While some previous surface fishing lures succeed in generating certain motions and splashing, there remains a need for a surface fishing lure that can create motion and splashing sufficient to attract fish from a distance from the fishing lure, without excessively reeling in the fishing lure.

It would be desirable to have a surface fishing lure for surface fishing wherein small movements of the fishing lure generate significant splashing and turbulence to attract fish that are a significant distance away from the fishing lure.

SUMMARY OF THE INVENTION

The present invention relates to a fishing lure adapted to spray water droplets fore or aft of the fishing lure. The fishing lure of the present invention has a monolithic fishing lure body extending along an axis from a head end to a tail end of the fishing lure body. A first substantially planar surface is formed at the head end of the fishing lure body, and the first substantially planar surface forms a first angle with respect to the axis. A second substantially planar surface is formed at the head end of the fishing lure body, and the second substantially planar surface forms a second angle with respect to the axis. A third angle is formed with respect to the first and second substantially planar surfaces such that the third angle is the sum of the first angle and the second angle. The third angle is between 83° and 130°. A crotch is defined by the intersection of the first substantially planar surface and the second substantially planar surface, and the crotch extends through and substantially transverse to the axis, wherein the crotch and the axis cooperate to define a plane that defines the fishing lure body into an upper portion and a lower portion adjacent to the first substantially planar surface and the second substantially planar surface, respectively. A hook tie eyelet for pivotally attaching a fishing hook thereto is connected to a central portion of the lower portion of the fishing lure body, and a line tie eyelet is connected to the head end of the fishing lure body.

In one embodiment, the line tie eyelet is positioned on the second substantially planar surface below and spaced from the crotch, and the third angle is between 95° and 130°. Furthermore, the third angle may be substantially or exactly 101°. Additionally, the first angle may be between 48° and 83°, and furthermore, the first angle may be substantially or exactly 53°. In addition, a low pressure forming necked portion may be disposed on the upper portion of the fishing lure body rearward of the first substantially planar surface.

In another embodiment, the line tie eyelet extends from the crotch, and the third angle is between 83° and 101°. Furthermore, the second angle may be between 43° and 61°. In addition, a weight may be disposed within the fishing lure body near the tail end of the fishing lure body.

BRIEF DESCRIPTION OF THE DRAWINGS

The description herein makes reference to the accompanying drawings wherein like referenced numerals refer to like parts throughout several views and wherein.

DETAILED DESCRIPTION

Figure 1:
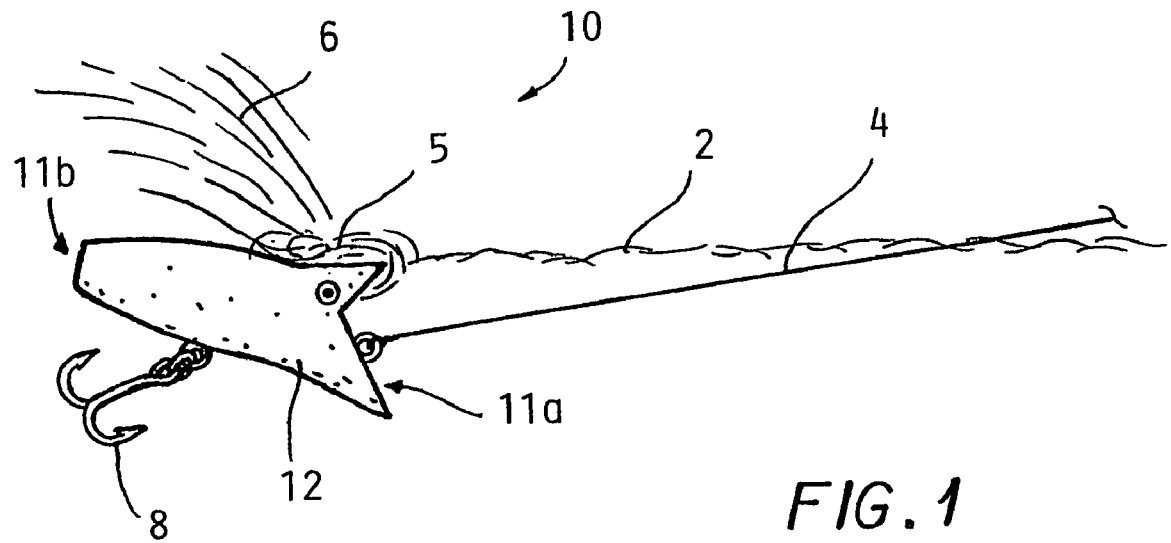
FIG. 1 is an illustration showing a fishing lure according to a first embodiment of the invention disposed within a body of water.

Referring to the drawings, the present invention will now be described in detail with reference to the disclosed embodiment.

FIGS. 1-6 show a fishing lure 10, 40 according to the present invention. The fishing lure 10, 40 includes a substantially monolithic fishing lure body 12 having a head end 11a and a tail end 11b. The fishing lure 10, 40 is painted to simulate a fish, and thus, the fishing lure 10, 40 may be painted with details such as eyes and a lighter colored underside so that the fishing lure 10, 40 closely resembles a fish or other prey which fish may consider bait. The fishing lure 10, 40 is attachable to a fishing line 4 so that the fishing lure 10, 40 may be guided through a body of water 2, such as a lake, stream, river, or pond. Furthermore, the fishing lure 10, 40 is pivotally connectable to a conventional treble hook 8 for hooking a fish upon the fish biting the fishing lure 10, 40. Through manipulation of the fishing lure 10, 40 by the line 4, the fishing lure 10, 40 is adapted to spray water droplets 6 fore or aft of the fishing lure 10, 40, as will be described herein. The spraying of water droplets 6 fore or aft of the fishing lure 10, 40 attracts fish that may not normally be close enough to be attracted to the fishing lure 10, 40 by and in itself.

Figure 2:
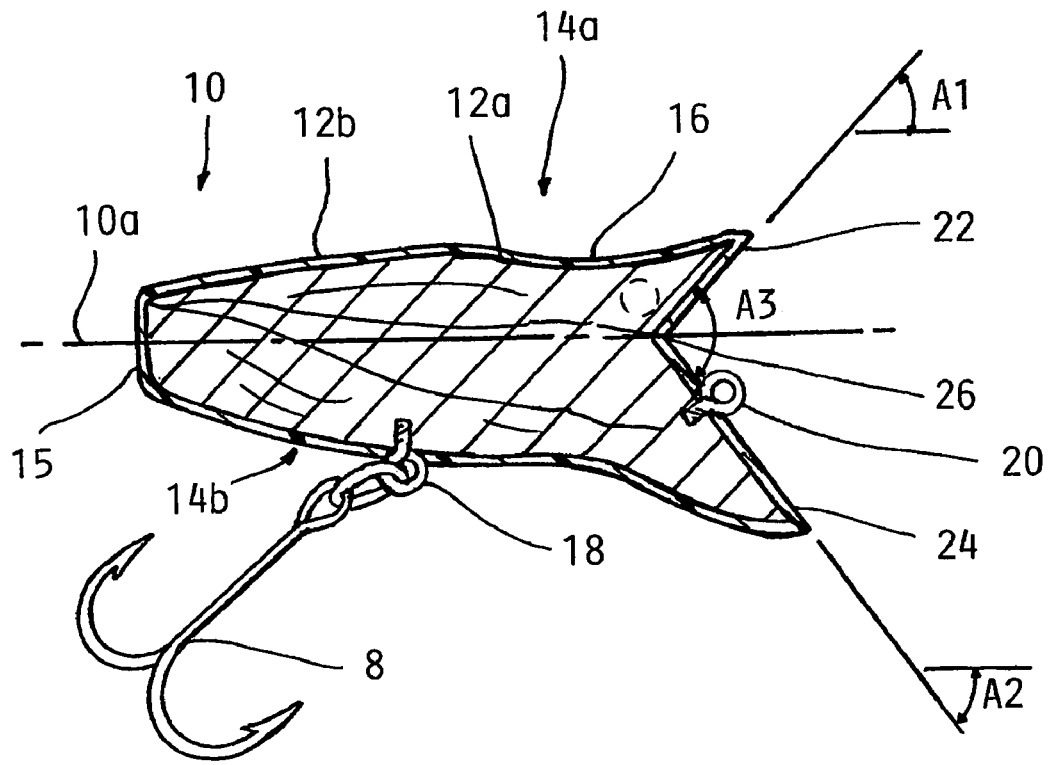
FIG. 2 is a section view of the fishing lure of FIG. 1.
Figure 3:
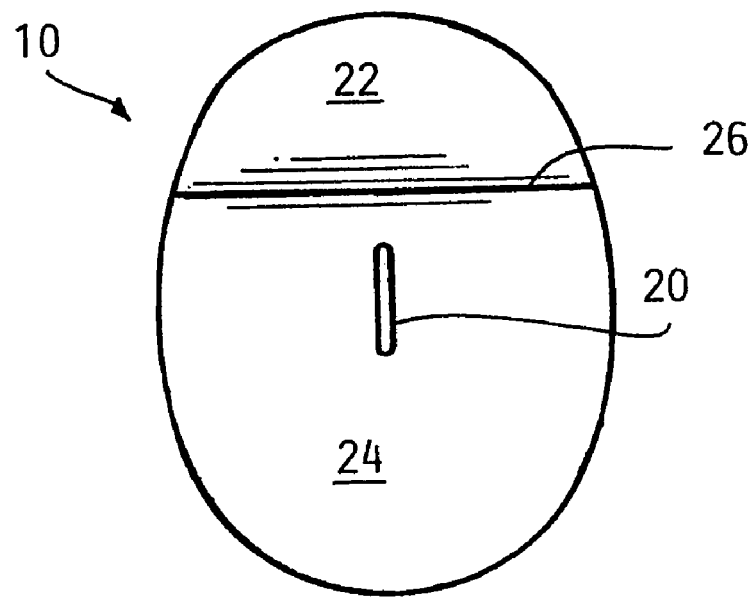
FIG. 3 is a front view of the fishing lure of FIG. 1.

In order to create turbulence 5 and spray water droplets 6 rearward of the fishing lure 10 as the fishing lure 10 is manipulated within the body of water 2, a first embodiment of the present invention provides the fishing lure body 12 with geometric features that impart the desired dynamic characteristics to the fishing lure 10, as shown in FIGS. 1-3. The fishing lure body 12 extends along a longitudinal axis 10a and includes a core 12a that is covered by a skin 12b. Since the fishing lure body 12 is adapted to float at or near the surface of the body of water 2, the core 12a of the fishing lure body 12 is fabricated from a low density material, such as wood. However, it is recognized that the core 12a could be fabricated from other suitable materials, such as a resin, various plastics, or a combination thereof. The skin 12b covers the core 12a to provide a smooth outer surface of the fishing lure body 12 to reduce friction as the fishing lure 10 is pulled through the water 2. The skin 12b may be fabricated from any suitable material, such as plastic. Furthermore, although the fishing lure body 12 is described herein as being comprised of a core 12a and a skin 12b, it is contemplated that the fishing lure body 12 could be fabricated from a single material, without the need for a separate core 12a and skin 12b.

The axis 10a extends from the head end 11a to the tail end 11b of the fishing lure body 12 and divides the fishing lure body 12 into an upper portion 14a and a lower portion 14b. Viewed in cross-section, the fishing lure body 12 is roughly conical but has arcuate sides that are generally substantially convex. At the tail end 11b of the fishing lure body 12, the fishing lure body 12 terminates at a rear face 15 that is substantially planar and extends perpendicular to the longitudinal axis 10a. Toward the head end 11a of the fishing lure body 12, a necked portion 16 is formed on the upper portion 14a on the fishing lure body 12 just rearward of the head end 11a. When viewed in cross section, the necked portion 16 is substantially concave, as compared to the arcuate, substantially convex shape of the remainder of the fishing lure body 12. As will be described in detail, when the fishing lure body 12 is moved through the body of water 2, the necked portion 16 creates an area of low pressure against the skin 12b of the fishing lure body 12, thereby creating a low pressure region 5 that produces a spray of water droplets 6 up to eight feet rearward of the fishing lure 10.

In order to control the angle at which the fishing lure body 12 of the fishing lure 10 moves through the body of water 2 and sprays water droplets 6 rearward of the fishing lure 10, a first substantially planar surface 22 and a second substantially planar surface 24 are formed at the head end 11a of the fishing lure body 12. The first substantially planar surface 22 and the second substantially planar surface 24 meet at a crotch 26, which extends through and is substantially transverse to the axis 10a and cooperates with the axis 10a to form a plane by which the upper portion 14a is separated from the lower portion 14b. The second substantially planar surface 24 extends farther forward of the crotch 26 than the first substantially planar surface 22, and, accordingly, the surface area of the second substantially planar surface 24 is greater than the surface area of the first substantially planar surface 22, as best seen in FIG. 3. The larger surface area of the second substantially planar surface allows the fishing lure 10 to dive just below the surface of the water 2, thereby providing the proper angle for spraying water droplets 6 rearward of the fishing lure 10.

The first substantially planar surface 22 forms a first angle A1 with respect to the axis 10a, and the second substantially planar surface 24 forms a second angle A2 with respect to the axis 10a. A third angle A3 is formed between the first substantially planar surface 22 and the second substantially planar surface 24 and is defined as the additive sum of the first angle A1 and the second angle A2. In this embodiment, the third angle A3 is preferably between 95° and 130°. Furthermore, excellent results have been obtained when the third angle A3 is substantially 101°, wherein substantially 101° is defined as the range between 98° and 104°. Furthermore, the first angle A1 is preferably between 48° and 83°, and excellent results have been obtained when the first angle is substantially 53°, wherein substantially 53° is defined as the range between 50° and 56°.

In order to pivotally connect the treble hook 8 to the fishing lure body 12, a hook tie eyelet 18 is connected to the fishing lure body 12 on a central portion of the lower portion 14b of the fishing lure body 12. The positioning of the hook and hook tie eyelet assist in the proper balancing of the fishing lure 10. In order to connect the line 4 to the fishing lure body 12, a line tie eyelet 20 is connected to the fishing lure body 12 near the head end 11a of the fishing lure body 12. Finally, in order to appropriately balance the fishing lure body 12 as it moves through the body of water 2, the line tie eyelet 20 is positioned on the second substantially planar surface 24, spaced from the crotch 26.

In use, the user ties or connects the fishing lure 10 to the fishing line 4. The fishing lure 10 and the line 4 are then cast into the body of water 2 in a conventional manner, for example, using a rod and reel (not shown). Once the fishing lure 10 is in the body of water, the user manipulates the fishing lure 10 by tugging or reeling in the fishing line 4. When the user manipulates the fishing lure 10 in this manner, the head end 11a of the fishing lure body 12 is at least partially submerged under the surface of the water 2. When the fishing lure 10 is advanced by pulling or reeling the fishing line 4, the flow of water over the necked portion 16 on the fishing lure body 12, in combination with the geometry of the first substantially planar surface 22, causes the spray of water droplets 6 rearward of the fishing lure 10, thereby attracting fish that are a substantial distance rearward of the fishing lure 10.

Figure 6:
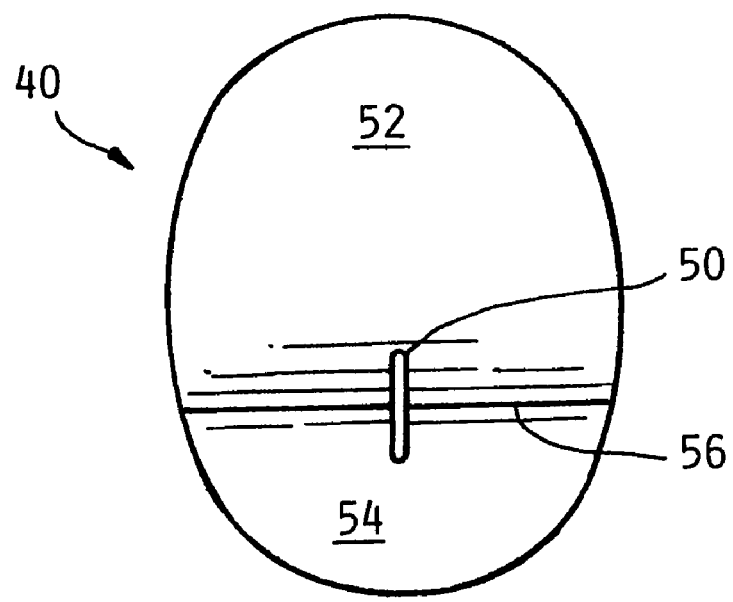
FIG. 6 is a front view of the fishing lure of FIG. 4.
Figure 4:
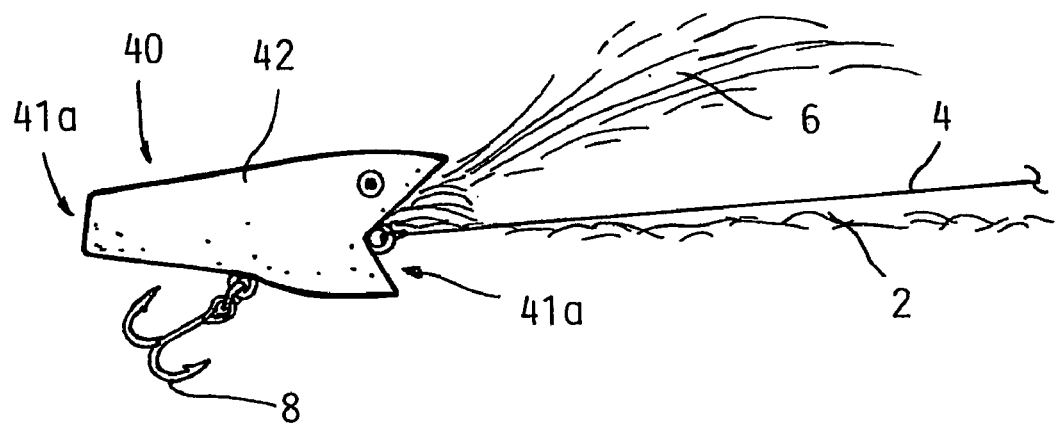
FIG. 4 is an illustration showing a fishing lure according to a second embodiment of the invention disposed within a body of water.
Figure 5:
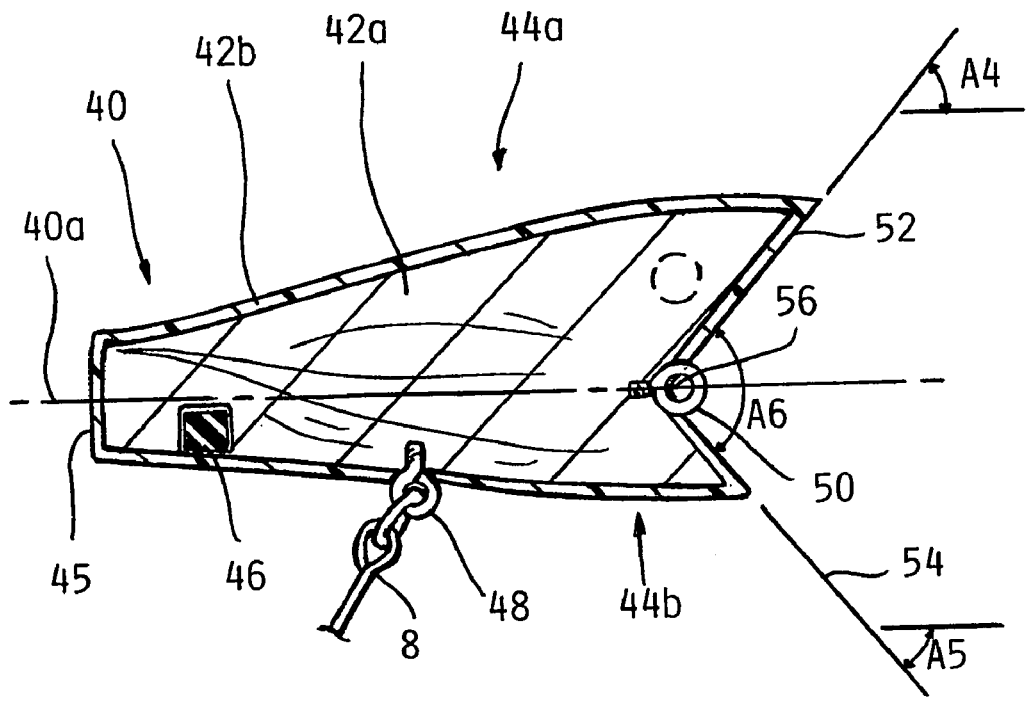
FIG. 5 is a sectional view of the fishing lure of FIG. 4.

FIGS. 4-6 show a fishing lure 40 according to a second embodiment of the present invention wherein water droplets 6 are sprayed up to eight feet forward of the fishing lure 40, thereby attracting fish that are located a substantial distance forward of the fishing lure 40, as will be described in detail herein. In order to spray water droplets 6 forward as the fishing lure 40 is manipulated within the body of water 2, the fishing lure body 42 of the fishing lure 40 is provided with geometric features that impart the desired dynamic characteristics to the fishing lure 40. As shown in FIG. 5, the fishing lure body 42 extends along a longitudinal axis 40a and includes a core 42a that is covered by a skin 42b. The axis 40a extends from the head end 41a to the tail end 41b of the fishing lure body 42 and divides the fishing lure body 42 into an upper portion 44a and a lower portion 44b. Since the fishing lure body 42 is adapted to float at or near the surface of the body of water 2, the core 42a of the fishing lure body 42 is fabricated from a low density material, such as wood. However, it is recognized that the core 42a could be fabricated from other suitable materials, such as a resin, various plastics, or a combination thereof. The skin 42b covers the core 42a to provide a smooth outer surface for the fishing lure body 42 and may be fabricated from any suitable material, such as plastic, in order to reduce friction when the fishing lure 40 is pulled through the water. However, although the fishing lure body 42 is described herein as being comprised of a core 42a and a skin 42b, it is contemplated that the fishing lure body 42 could be fabricated from a single material, without the need for a separate core 42a and skin 42b.

Viewed in cross-section, the fishing lure body 42 is somewhat conical, becoming progressively wider from the tail end 41b to the head end 41a of the fishing lure body 42 and having its widest diameter near the head end 41a of the fishing lure body 42. However, the fishing lure body 42 is not actually conical, as the sides of the fishing lure body 42 are arcuate in the longitudinal direction, rather than straight, when viewed in cross-section. At the tail end 41b of the fishing lure body 42, the fishing lure body 42 terminates at a rear face 45 that is substantially planar and extends perpendicular to the longitudinal axis 40a.

In an additional embodiment, a weight 46 may be disposed within the core 42b of the fishing lure body 42. Depending on the materials utilized to fabricate the fishing lure body 42, the weight 46 may assist in keeping the head end 41a of the fishing lure body 42 partially above the surface of the water 2. Accordingly, the weight 46 shifts the center of gravity of the fishing lure body 42 rearward, urging the head end 41a of the fishing lure body 42 upward. The weight 46 may vary depending on the weight of the fishing lure body 42.

In order to control the angle at which the fishing lure body 42 of the fishing lure 40 moves through the body of water 2, as well as to spray water droplets 6 forward of the fishing lure 40, a first substantially planar surface 52 and a second substantially planar surface 54 are formed at the head end 41a of the fishing lure body 42. The first substantially planar surface 52 and the second substantially planar surface 54 meet at a crotch 56, which extends through and is substantially transverse to the axis 40a and cooperates with the axis 40a to form a plane by which the upper portion 44a is separated from the lower portion 44b of the fishing lure body 42. The first substantially planar surface 52 extends farther forward of the crotch 56 than the second substantially planar surface 54, and, accordingly, the surface area of the first substantially planar surface 52 is greater than the surface area of the second substantially planar surface 54, as best seen in FIG. 6. The first substantially planar surface 52 forms a first angle A4 with respect to the axis 40a. The second substantially planar surface 54 forms a second angle A5 with respect to the axis 40a. A third angle A6 is formed between the first substantially planar surface 52 and the second substantially planar surface 54 and is defined as the additive sum of the first angle A4 and the second angle A5. In this embodiment, the third angle A6 is between 83° and 101°, wherein the first angle A4 is between 40° and 60° and the second angle A5 is between 41° and 61°. Preferably, however, the first angle A4 is substantially 40°, and the second angle A5 is between 43° and 61°.

In order to pivotally connect the treble hook 8 to the fishing lure body 42, a hook tie eyelet 48 is connected to the fishing lure body 42 on a central portion of the lower portion 44b of the fishing lure body 42. The positioning of the hook 8 and hook tie eyelet 48 assist in the proper balancing of the fishing lure 40. In order to connect the line 4 to the fishing lure body 42, a line tie eyelet 50 is connected to the fishing lure body 42 near the head end 41a of the fishing lure body 42. In order to appropriately balance the fishing lure body 42 as it moves through the body of water 2, the line tie eyelet 50 is positioned directly on the crotch 56 between the first substantially planar surface 52 and the second substantially planar surface 54.

In use, the user ties or connects the fishing lure 40 to the fishing line 4. The fishing lure 40 and fishing line 4 are then cast into the body of water 2 in a conventional manner, for example, using a rod and reel (not shown). Once the fishing lure 40 is in the body of water, the user manipulates the fishing lure 40 by tugging or reeling in the fishing line 4. When the user manipulates the fishing line 4 in this manner, the head end 11a of the fishing lure body 42 is disposed at least partially above the surface of the body of water 2. When the fishing lure 40 is advanced by pulling or reeling the fishing line 4, interaction of the water 2 with the first substantially planar surface 52 sprays water droplets 6 forward of the fishing lure 40, thus attracting fish forward of the fishing lure 40 that would not normally be attracted to the fishing lure 40 in and of itself.

While the invention has been described in connection with what is presently considered to be the most practical and preferred embodiment, it is to be understood that the invention is not to be limited to the disclosed embodiments, but to the contrary, it is intended to cover various modifications or equivalent arrangements included within the spirit and scope of the appended claims. The scope is to be accorded the broadest interpretation so as to encompass all such modifications and equivalent structures as is permitted under the law.

What is claimed is:

1. A fishing lure for spraying water droplets fore or aft of said fishing lure in a body of water, comprising:
   a monolithic fishing lure body extending along a substantially straight axis from a head end to a tail end of said fishing lure body, wherein said tail end is defined by a substantially flat surface, said fishing lure body being solid throughout its entirety and having no openings extending therethrough, said fishing lure body having a top, a bottom, and opposing lateral sides, said fishing lure body having a roughly conical profile that tapers from a maximum diameter near said head end of said fishing lure body to a minimum diameter near said tail end of said fishing lure body, wherein said roughly conical profile comprises said top and bottom tapering toward each other and said opposing sides tapering toward each other;
   a first substantially planar surface formed at said head end of said fishing lure body, and said first substantially planar surface forming a first angle with respect to said axis;
   a second substantially planar surface formed at said head end of said fishing lure body, and said second substantially planar surface forming a second angle with respect to said axis, wherein one of said first and second planar surfaces extends further from said fishing lure body and has a greater surface area than the other of said first and second planar surfaces;
   a third angle with respect to said first and second substantially planar surfaces such that said third angle is the sum of said first angle and said second angle, wherein said third angle is between 83° and 130°, wherein said first angle, said second angle, and said third angle are configured to cause said fishing lure body to spray water droplets either fore or aft as the fishing lure body is moved through the body of water;
   a crotch defined by an intersection of said first substantially planar surface and said second substantially planar surface forming a substantially straight line, said crotch extending through and substantially transverse to said axis with said axis extending through said flat surface of said tail end of said fishing lure body, wherein said crotch and said axis cooperate to define a plane that divides said fishing lure body into an upper portion and a lower portion adjacent to said first substantially planar surface and said second substantially planar surface, respectively, and further wherein said first substantially planar surface and said second substantially planar surface extend forward from said crotch, and said first and second substantially planar surfaces having perimeters that are entirely accurate, each of said perimeters having opposing portions which each extend from respective opposite ends of said crotch;
   a hook tie eyelet connected to a longitudinal central portion of said lower portion of said fishing lure body between said crotch and said tail end of said fishing lure body for pivotally attaching a fishing hook thereto; and
   a line tie eyelet positioned either on one of said first and second planar surfaces of said fishing lure body or at said crotch.

2. The fishing lure stated in claim 1, wherein said line tie eyelet is positioned on said second substantially planar surface below and spaced from said crotch and wherein said third angle is between 95° and 130°.

3. The fishing lure stated in claim 2, wherein said third angle is between 98° and 104°.

4. The fishing lure stated in claim 2, wherein said first angle is between 48° and 83°.

5. The fishing lure stated in claim 2, wherein said first angle is between 50° and 56°.

6. The fishing lure stated in claim 1, wherein said line tie eyelet both is positioned at and extends from said crotch and wherein said third angle is between 83° and 101°.

7. The fishing lure stated in claim 6, wherein said second angle is between 43° and 61°.

8. The fishing lure stated in claim 1, further comprising:
a low pressure forming necked portion disposed on said upper portion of said fishing lure body rearward of said first substantially planar surface and forward of said hook tie eyelet.

9. The fishing lure stated in claim 1, further comprising:
a weight disposed within said tail end of said fishing lure body.

10. A fishing lure for spraying water droplets fore or aft of said fishing lure in a body of water, comprising:
a monolithic fishing lure body extending along a substantially straight axis from a head end to a tail end of said fishing lure body, wherein said tail end is defined by a flat surface, and said fishing lure body having an upper portion disposed above said axis and a lower portion disposed below said axis, said fishing lure body being solid throughout its entirety and having no openings extending therethrough, said fishing lure body having a top, a bottom, and opposing lateral sides, said fishing lure body having a roughly conical profile that tapers from a maximum diameter near said head end of said fishing lure body to a minimum diameter near said tail end of said fishing lure body, wherein said roughly conical profile comprises said top and bottom tapering toward each other and said opposing sides tapering toward each other;
a first substantially planar surface formed on said head end of said fishing lure body on said upper portion thereof, said first substantially planar surface having a first surface area, and said first substantially planar surface forming a first angle with respect to said axis;
a second substantially planar surface formed on said head end of said fishing lure body and on said lower portion thereof, said second substantially planar surface having a second surface area different than said first surface area, and said second substantially planar surface forming a second angle with respect to said axis;
a third angle with respect to said first and second substantially planar surfaces such that said third angle is the sum of said first angle and said second angle, wherein said third angle is between 83° and 130°;
a crotch defined by a substantially straight line corner created by an intersection of said first substantially planar surface and said second substantially planar surface wherein said first and second substantially planar surfaces having perimeters being entirely arcuate, each of said perimeters having opposing portions which each extend from respective opposite ends of said crotch, and said crotch extending through and substantially transverse to said axis with said axis extending through said flat surface of said tail end wherein said first and second planar surfaces extend forward of said crotch, and one of said first and second planar surfaces extends further from said fishing lure body and has a greater surface area than the other of said first and second planar surfaces;
a hook tie eyelet connected to said fishing lure body on a longitudinal central portion of said lower portion between said crotch and said tail end of said fishing lure body thereof for attaching a fishing hook thereto; and
a line tie eyelet connected to said lure body, said line tie eyelet positioned either on one of said first and second planar surfaces or at said crotch.

11. The fishing lure stated in claim 10, further comprising:
a low pressure forming necked portion disposed on said upper portion of said lure body rearward of said first substantially planar surface and forward of said hook tie eyelet; and
said line tie eyelet is positioned on said second substantially planar surface below and spaced from said crotch.

12. The fishing lure stated in claim 11, wherein said second surface area is greater than said first surface area and wherein said first angle is between 50° and 56° and said third angle is between 98° and 104°.

13. The fishing lure stated in claim 12, wherein said third angle is 101°.

14. The fishing lure stated in claim 12, wherein said first angle is 53°.

15. The fishing lure stated in claim 10, further comprising:
said line tie eyelet positioned at said crotch.

16. The fishing lure stated in claim 15, wherein said third angle is between 83° and 101°.

17. The fishing lure stated in claim 16, wherein said second angle is between 43° and 61°.

* * * * *

UNITED STATES PATENT AND TRADEMARK OFFICE
CERTIFICATE OF CORRECTION

PATENT NO. : 7,716,871 B1  Page 1 of 1
APPLICATION NO. : 11/891119
DATED : May 18, 2010
INVENTOR(S) : Sayers It is certified that error appears in the above-identified patent and that said Letters Patent is hereby corrected as shown below:

1. In Col. 5, line 32, please delete "60 and" and insert --60, and--; and

2. In Col. 6, line 54, please delete "accurate" and insert --arcuate--.

Signed and Sealed this

Seventeenth Day of August, 2010

David J. Kappos
*Director of the United States Patent and Trademark Office*